United States Patent [19]

Boyce et al.

[11] 4,447,752

[45] May 8, 1984

[54] BALL CONTACT SLIP RING ASSEMBLY

[75] Inventors: Arthur J. Boyce, Cambridge, Mass.; David Gold, Tacoma Park, Md.

[73] Assignee: The Charles Stark Draper Laboratory, Inc., Cambridge, Mass.

[21] Appl. No.: 385,534

[22] Filed: Jun. 7, 1982

[51] Int. Cl.[3] .............................................. H02K 13/00

[52] U.S. Cl. .................................... 310/232; 310/248

[58] Field of Search ............... 310/219, 231, 232, 238, 310/247, 248, 251, 252, 239

[56] References Cited

U.S. PATENT DOCUMENTS 3,089,113 5/1963 Mohr .................................. 310/238

3,564,168 6/1969 Bigg .................................... 310/232

*Primary Examiner*—Donovan F. Duggan
*Assistant Examiner*—Anita M. Ault
*Attorney, Agent, or Firm*—Weingarten, Schurgin, Gagnebin & Hayes

[57] ABSTRACT

A ball contact slip ring assembly for conducting electrical signals between two relatively rotating structures, and which is particularly suited for use in gimbaled inertial guidance systems. The assembly includes a slip ring disposed on one structure and a brush associated with the ring on the other structure. The slip ring is provided with a groove which extends around the outer circumference thereof and the slip ring may be composed of a relatively soft noble metal. The brush comprises a pair of spring-biased, resilient arms spaced from one another, each arm having an electrically conductive ball secured thereto which is adapted to ride within the groove of the slip ring and accommodate diverse motion while maintaining a consistent electrical contact. The balls may be composed of a low friction, corrosion resistant material while the brush may be composed of a suitably resilient material with high electrical conductivity which is different from that of the ball and which applies the proper loading to the balls. Where a plurality of such assemblies are required, adjacent brushes and slip rings are separated by insulation material in a molded or laminated housing, and the brushes may be fixed or allowed to float, being held in position axially by slots in the outer housing and radially by the brush block or the outer sleeve.

14 Claims, 8 Drawing Figures

PRIOR ART

BALL CONTACT SLIP RING ASSEMBLY

FIELD OF THE INVENTION

This invention relates generally to slip ring assemblies and more particularly to a ball contact slip ring assembly for use in inertial guidance systems.

BACKGROUND OF THE INVENTION

In conventional slip ring assemblies, spaced wire arms of a brush typically ride in a groove disposed on an outer perimeter of a rotating slip ring. Such slip rings are well known to those in the inertial navigation arts and have been used for years in conducting electrical power and signal currents across the pivots of gimbaled systems having freedom of motion used to mount gyroscopes. These prior art slip ring assemblies have been plagued with both manufacture and service use problems causing fairly high removal rates for repair and overhaul. These assemblies are extremely delicate and require high assembly skill and time consuming adjustment to achieve a preload consistent with minimum sliding friction in a vibration and shock-prone environment.

Since such gyroscopic devices generally operate in a vibratory environment, and since sliding contact exists between the brushes and the slip rings, friction polymers tend to build up on the slip rings causing electrical noise and/or open circuits producing an intermittent signal and requiring removal of the slip ring assemblies for cleaning and/or replacement. Furthermore, electrical noise is found in this type of slip ring assembly, and this noise usually is effectively amplified, rendering the signal undesirably noisy, thereby detracting from the signal quality. This noise often is produced by the generation of wear particles between the slip ring and brushes. A third problem often encountered in such assemblies is misalignment of the brushes with respect to the grooved rings resulting from tolerances during assembly. Adjustments to secure a proper fit and loading of brushes at final assembly is not required, thereby eliminating residual stresses in the brushes and subsequent brush load changes with time. Since the brush arms are usually cylindrical, this misalignment causes the brush arms to ride upwardly within the slip ring groove, thereby producing a noisy and/or intermittent signal. Fourthly, the brushes tend to hydroplane on the slip ring surface, especially at high rotational speeds and in the presence of a lubricant. Lastly, the frictional coefficient tends to be high because of the limited choice of satisfactory materials which can be used to serve both as a spring and an electrical contact. The hydroplaning and some of the noise problems may be overcome by increasing the brush loading or elimination of the lubricant, but these changes do not cure the high friction and misalignment problems.

Rolling electrical contact assemblies, such as that shown and described in U.S. Pat. No. 4,068,909 have been developed to overcome some of these problems. However, such assemblies are not suitable for all gyroscopic and inertial system uses, and do not have the wiping action necessary to remove contamination.

SUMMARY OF THE INVENTION

This invention concerns a slip ring assembly for transmitting electrical power and signal currents between relatively rotating structures and which is particularly suited for use in inertial guidance systems. Each slip ring assembly includes one or more generally circular slip rings adapted to rotate with one structure and typically having a groove disposed around the outer perimeter thereof. The slip ring is formed of a relatively soft noble metal. Associated with the slip ring is a generally horseshoe shaped brush having two resilient arms. Each arm of the brush has a generally spherical ball bonded at the tip. The brush is mounted with the balls riding in the groove of the slip ring. A spring force is applied by each arm to supply the necessary loading of the ball within the slip ring groove, and the brush arms and their associated balls are disposed on generally opposite sides of the slip ring to grasp the slip ring therebetween. The brush arms may be composed of a material with a high electrical conductivity, which is resilient and which provides the desired loading while the spherical balls may be composed of any material having the desired electrical contact and frictional characteristics.

A plurality of the above-described slip rings and associated brushes are axially attached to form a slip ring assembly for transferring a large number of independent signals to and from relatively rotating structures. In such an assembly, the individual brushes are separated by an electrically insulative material which form slots to axially restrain the brushes. The associated individual slip rings are likewise insulatively spaced from one another. The individual brushes may be fixed after individual installation or allowed a limited amount of unrestrained movement so as to float with respect to the assembly. This permits equalization of the forces applied to each ball and groove interface. Electrical signals are transferred to and from each brush by individual electrical connections with their associated brushes.

The slip ring assembly of this invention has many advantages over the prior art slip ring assemblies. Since the material comprising the balls may be different from the material comprising the brush arms, each material may be selected to optimally perform the task desired. Thus, the balls may be composed of iridium or other noble metal having the desired electrical contact and friction characteristics, while a material may be selected for the brush arms having the resiliency necessary to provide the desired loading and high electrical conductivity. Typically the loading is set such that the soft material of the slip ring is deformed so that the groove ultimately conforms to the shape of the ball. As a result of the optimization of the frictional and loading characteristics, wear particles from the relatively soft slip ring material are flattened out reducing the noise, and the effects of friction polymers and hydroplaning are minimized. The spherical shape of the contact ball permits continued electrical connection between the slip ring groove and the ball even if the brush and the ring should become misaligned.

DESCRIPTION OF THE DRAWING

The invention will be more fully understood from the following detailed description taken in conjunction with the accompanying drawing, in which.

DETAILED DESCRIPTION OF THE INVENTION

Figure 1:
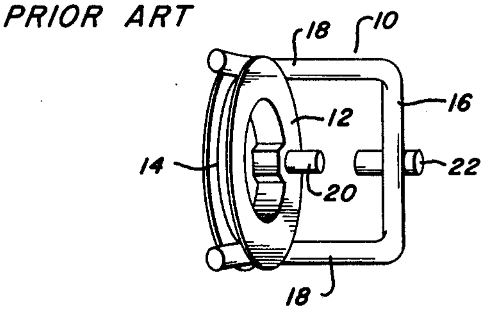
FIG. 1 is a pictorial representation of a prior art slip ring and brush.

Referring now to the drawing, and more particularly to FIG. 1 thereof, a typical prior art single slip ring assembly 10 includes a generally circular slip ring 12 having a groove 14 disposed about the outer perimeter thereof. A brush 16 has a pair of arms 18 which are adpated to ride within groove 14 on opposite sides of slip ring 12. A slip ring wire 20 extends from slip ring 12 to a connection on a rotating member, while a brush wire 22 extends from brush 16 to external circuitry. Brush arms 18 should be sufficiently resilient to possess the spring bias necessary to provide proper loading on the slip ring. Brush arms should also be of a highly conductive, low friction, wear and corrosion resistant material to provide long life and reliable signal transmission. However, no known material optimally possesses all of these qualities, and as a result the material chosen compromises some of them. Typically, the entire brush is formed of a noble metal which does not have both the necessary resilient qualities and a low coefficient of friction, and low loading must be applied to the slip ring to accommodate the relatively high coefficient of friction. Because of this low loading, electrical noise is more likely, especially that caused by frictional polymers and/or wear particles. Because of the cylindrical shape of arms 18, if the slip ring and the brush become misaligned temporarily or permanently, the arms tend to load the four points of contact unevenly, thereby increasing the signal noise of the contact with respect to signals carried by it. Misalignment of arms 18 in groove 14 also causes a drag torque resulting from the increased effective loading at the points of contact.

Figure 2:
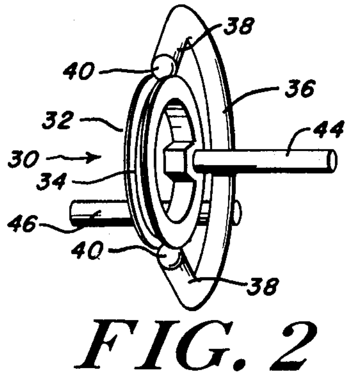
FIG. 2 is a pictorial representation of the brush and slip ring of the present invention.
Figure 5:
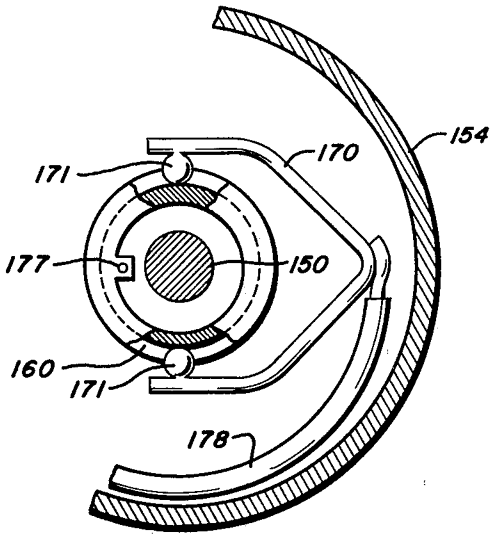
FIG. 5 is a partial cross-sectional end view of the assembly of FIG. 4.
Figure 3:
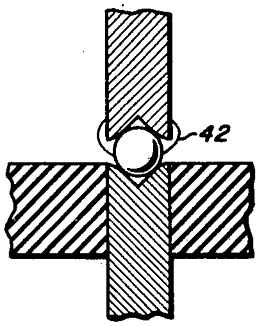
FIG. 3 is a cross-sectional view of the interface of the brush and slip ring of FIG. 2.

A single slip ring assembly 30 exemplary of the present invention is shown in FIGS. 2 and 3. Assembly 30 includes a horseshoe shaped brush 36 and a circular slip ring 32 which has a groove 34 extending around the outer circumference thereof. Brush 36 includes a pair of arms 38 which, during operation, are disposed on either side of slip ring 32. Attached to each arm 38 is a contact ball 40 which is configured to ride in groove 34. Ball 40 has a generally spherical shape and may be bonded as by welding fillets 42 (FIG. 3) at any point along each arm 38. Typically, ball 40 is disposed either at the end of each arm 38 as shown in FIG. 2 or at some point closely spaced therefrom, as shown in FIG. 5. A slip ring wire 44 extends from slip ring 32, while a brush wire 46 extends from brush 36 to a position external thereof.

Since brush 36 and contact ball 40 are formed as separate elements, they may be composed of different materials. Thus, materials may be separately selected for the contact ball 40 and arms 38 which each provide the desired performance characteristics, and a compromise on materials or performance is no longer required. Preferably, brush 36 is formed of a material having a resilient quality sufficient to provide the desired loading of arms 38 on slip ring 32, and this marterial need not be a noble metal, reducing the cost of the assembly. Arms 38 of brush 36 typically have a cylindrical cross-sectional shape, although other shapes are possible such as elliptical or rectangular shapes. Contact ball 40 is preferably composed of a low friction noble metal for providing an optimal electrical connection between slip ring 32 and brush 36.

The brush 36 is formed, heat treated, and machined such that the brush assembly with two balls 40 attached has the correct dimensions to provide a known load to the slip ring 32 without any adjustment at assembly. This eliminates any residual stresses in the brush resulting from such adjustments which could cause subsequent brush load changes.

Slip ring 32 is typically formed of a relatively soft noble metal, such as gold. Groove 34 therein typically is formed with a V-shape, as shown in FIG. 3, at least initially, although a more rounded groove is also possible. In either event, the spring loading on contact ball 40 is set such that the relatively soft material of slip ring 32 is deformed so that groove 34 ultimately conforms to the shape of contact ball 40 with use. In this manner, electrical contact is maintained with low contact resistance and electrical noise. The ring material remains attached to slip ring 32 and therefor does not become a loose wear particle.

The use of a low friction metal reduces the frictional drag on slip ring 32 and thus reduces the torque thereon as compared to the cylindrical prior art brushes of FIG. 1. This lower frictional effect permits a higher brush loading to be used in the present invention over the prior art. These higher loads tend to flatten out wear particles that may develop, and may also scrape away any friction polymers that tend to build up on the contacting surfaces, thus reducing electrical noise and interruptions of the signal. Typically, eight to nine gram loading is used in the assembly of the present invention, while three to four gram loading is used in the prior slip ring assemblies of FIG. 1.

Figure 6:
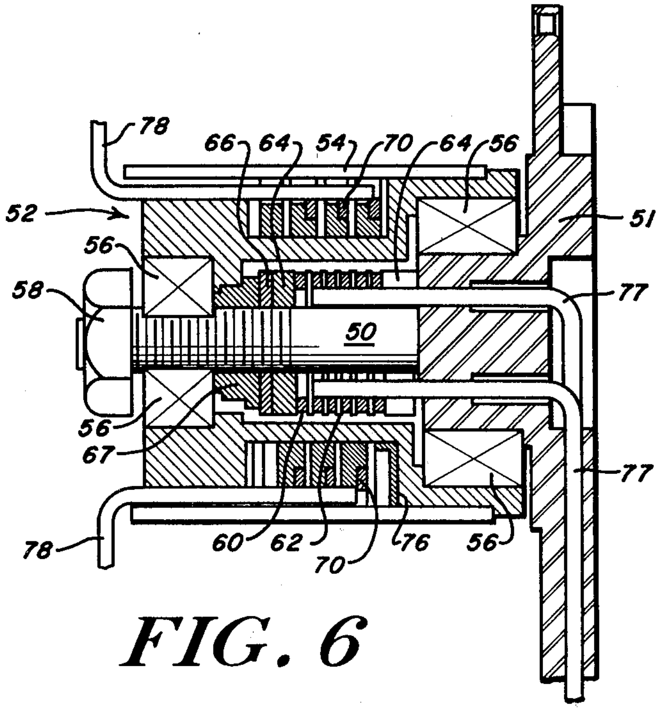
FIG. 6 is a cross-sectional view of another completed slip ring assembly of this invention.
Figure 4:
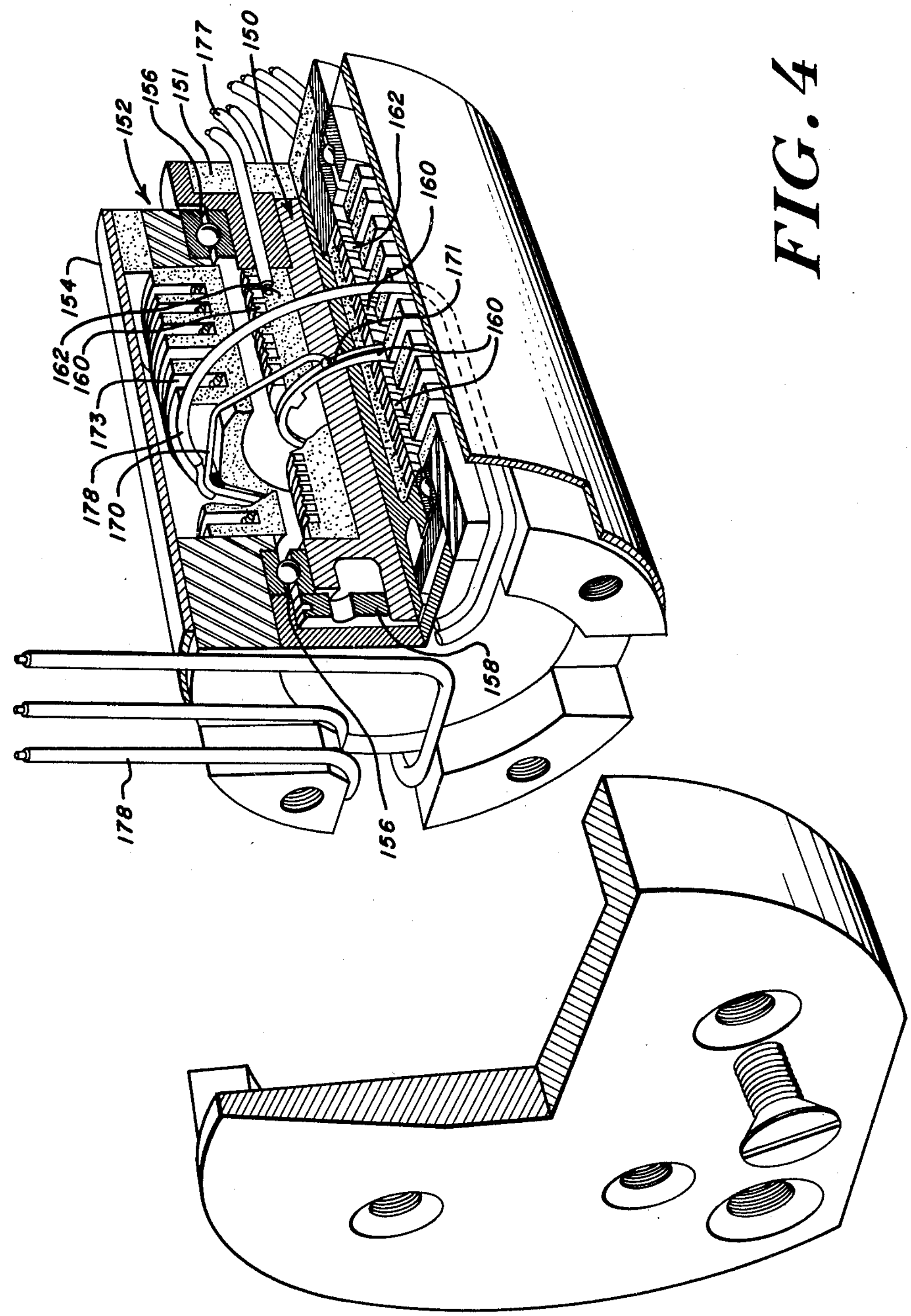
FIG. 4 is a partially cutaway view of one completed slip ring assembly of this invention.
Figure 7:
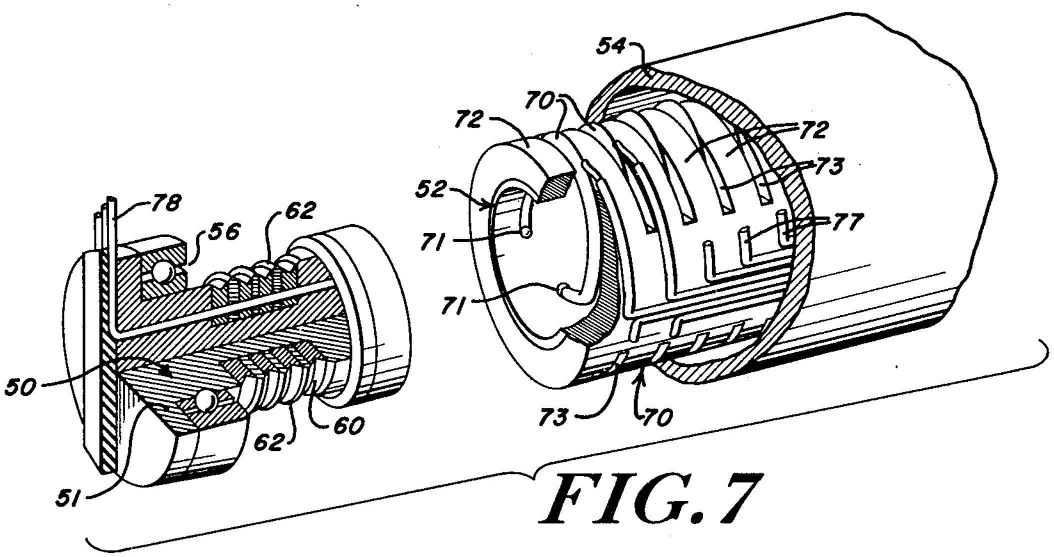
FIG. 7 is a partially exploded, cutaway view of the assembly of FIG. 6.

The slip ring assembly of this invention may be used in combination with a plurality of other assemblies in a complex ball contact slip ring inner assembly. The inner assembly may be either laminated, as shown in FIGS. 6 and 7 or preferably molded as shown in FIGS. 4 and 5. With reference now to the molded assembly of FIGS. 4 and 5, a shaft 150 is rotatably disposed with respect to a brush block 152, and bearings 156 are provided to permit relative rotation between shaft 150 and block 152. An outer sleeve 154 surrounds brush block 152. Securing means 158, typically a preload sleeve, is disposed on one end of shaft 150, while the other end 151 of shaft 150 is enlarged, and means 158 and end 151 maintain shaft 150 axially aligned with respect to brush block 152. A plurality of grooved slip rings 160 are disposed about the outer circumference of shaft 150. Slip rings 160 are similar to slip ring 32. Between each slip ring 160 is disposed an insulating ring 162 electrically isolating the slip rings 160 from one another and from shaft 150.

Brush block 152 includes a plurality of brushes 170, and each brush 170 is associated with one of slip rings 160. Brushes 170 are provided with contact balls 171 on the arms thereof at a position spaced from the end of the arms, but brushes 170 are otherwise similar to brushes 36 shown in FIG. 2. Balls 171 ride in the groove in their associated slip ring 160, as shown in FIG. 5, and the brush arms are provided with a spring-bias to apply the proper loading to the slip ring 160. Typically, brushes 170 are disposed on two opposite sides of brush block 152, and the brushes on one side alternate with the brushes on the other side. This arrangement allows more brushes to be packed into a given axial dimension. Thus, adjacent slip rings are associated with brushes extending toward shaft 150 from opposite sides of brush block 152. Block 152 is provided with a plurality of slots 173 through which brushes 170 extend. Slots 173 electrically isolate adjacent brushes 170 from one another and serve to properly align the brushes. Outer sleeve 154 is a non-conductive material which electrically isolates brushes 170 from one another. Electrically connected to each slip ring 160 is a wire 177 which is electrically insulated from shaft 150 and from all other slip rings 160 and which extends externally of shaft 150. Similarly, associated with each brush 170 is a wire 178 which is electrically insulated from all other brushes and which extends externally of brush block 152.

In an alternative embodiment, as shown in FIGS. 6 and 7, the slip ring inner assembly may be laminated as opposed to the molded assembly described in FIGS. 4 and 5. The embodiment of FIGS. 6 and 7 is otherwise similar to that of FIGS. 4 and 5, in most respects. A shaft 50 is rotatably disposed with respect to brush block 52, and bearings 56 are disposed therebetween to permit rotation of shaft 50 relative to brush block 52. Brush block 52 is surrounded by an outer sleeve 54. Securing means 58, which in this embodiment is typically a nut and threaded shaft arrangement, is disposed on one end of shaft 50 while the other end 51 of shaft 50 is enlarged for axial alignment of shaft 50 with respect to brush block 52. A plurality of grooved slip rings 60 similar to slip rings 160 are disposed about the outer circumference of shaft 50. Between each slip ring 60 is disposed an insulating ring 62 electrically isolating rings 60 from one another and from shaft 50. A spacer ring 64 is disposed at either end of the slip rings to insulate them from shaft 50, and a shim 66 is provided to properly position the slip rings on shaft 50. A slip ring lock nut 67 is adapted to be screwed onto shaft 50 to lock the slip rings into position.

Brush block 52 includes a plurality of brushes 70 and associated contact balls 71 similar to brushes 170 and balls 171, and each brush 70 is associated with one of slip rings 60. Balls 71 ride in the groove in their associated slip ring 60, in a manner similar to that shown in FIG. 5, and the brush arms are provided with a spring bias to apply the proper loading to the slip ring 60. Typically, brushes 70 are alternately disposed on two opposite sides of brush block 52, as in FIG. 4. Block 52 is surrounded by an insulating sleeve 72 having slots 73 therein to retain brushes 70 on each side of brush block 52. Sleeve 72 electrically isolates adjacent brushes from one another and defines slots 73 to properly align the brushes. Outer shaft 54 is a non-conductive material which also electrically isolates brushes 70 from one another. A shim 76 may be provided to properly align the brushes 70 with their associated slip rings 60. Electrically connected to each slip ring 60 is a wire 77 which is electrically insulated from shaft 50 and all other slip rings 60 and which extends externally of shaft 50. Similarly, associated with each brush 70 is a wire 78 which is electrically insulated from all other brushes and which extends externally of brush block 52.

In either of the embodiment of FIGS. 4 and 5 or that of FIGS. 6 and 7, brushes 70 and 170 may be floated, in which case they are retained in place primarily by the spring loading on their associated slip rings, by slots 73 and 173 and by sleeves 54 and 154. Sleeves 54 and 154 also serves to prevent brushes 70 and 170 from popping out of their associated slots 73 and 173. Floating brushes are preferred, since they accommodate oscillations in the shaft as well as misalignments thereof with respect to the brush block, thereby obviating removal and replacement of slip ring assemblies which have been altered by such misalignments or by the shock and vibration normally associated with inertial guidance systems. Also, the floating brush feature prevents the differential loading on the slip rings by the opposite arms of its associated brush, since the brushes are permitted to position themselves to equalize the loading forces.

Figure 8:
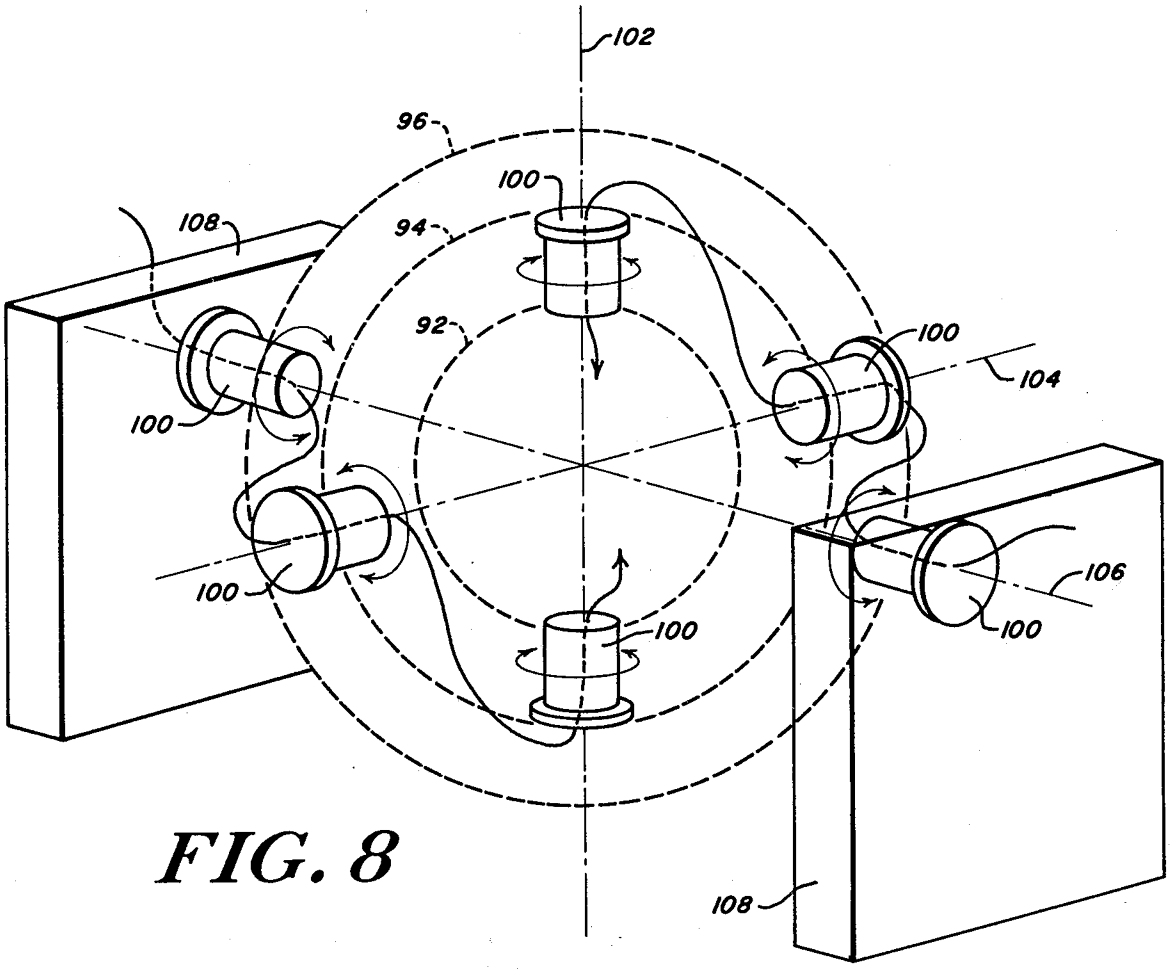
FIG. 8 is a pictorial representation of an inertial system employing the slip ring assembly of this invention.

FIG. 8 is a pictorial rendition of a typical inertial guidance system utilizing the assemblies of FIGS. 4–6, thus illustrating the environment and application for which these assemblies are intended. The system shown in FIG. 7 is adapted for three-axis sensing and includes three gimbaled shells, an inner shell 92, a middle shell 94 and an outer shell 96. Six slip ring assemblies 100 are provided to gimbal shell 92 about three axes 102, 104 and 106 with respect to an external frame 108 and to provide electrical connections between frame 108 and shell 92. The inertial guidance system has an inertial sensor such as a set of gyroscopes within shell 92.

Some of the components of these slip ring assemblies may be formed in several different configurations for specialized purposes. Furthermore, these slip ring assemblies may be utilized in conjunction with apparatus other than the inertial guidance systems described herein, such systems being only exemplary of an environment where the application of the slip ring assemblies of the present invention is particularly useful. Ball 40 typically is formed of a noble metal, such as iridium. Ball 40 need not be a perfect sphere and may be formed as a drop ball cast in an inert atmosphere or it may be formed as one skilled in the art would form a ball bearing. Brush 36 is typically a drawn wire and is shaped and spring biased to provide the proper loading between ball and slip ring and to conform to the desired configuration of the slip ring assembly. Brush 36 and arms 38 preferably are formed of a beryllium copper alloy. Ball 40 may be secured to brush 36 by soldering, percussive welding, laser welding, brazing, electroplate bonding or diffusion bonding. Ball 40 may be very small such as a small fraction of a millimeter, for example 0.25 mm. The optimal material combination for low noise is a slip ring 32 formed of 24 carat wrought gold with an iridium ball 40. Preferably, a lubricant is not used, and the slip ring assembly is generally run dry.

The above description is exemplary, modifications and improvements are intended to fall within the scope of this invention as defined solely in the following claims.

What is claimed is:

1. A slip ring assembly comprising:

an electrically conductive circular slip ring having a groove with opposing walls extending about the outer circumference thereof;

an electrically conductive brush having two opposed arms disposed on generally opposite sides of said slip ring and being spring-biased toward said slip ring; and two ball contact members, one ball contact member being mechanically fastened to, and affixed in electrical communication with, each of said arms of said brush, each of said ball contact members having a generally spherical contact surfaces seated in said slip ring groove to ride therein contacting opposing groove walls, each of said ball contact members being provided with a predetermined loading supplied by the spring bias imparted by said brush arms.

2. A slip ring assembled as recited in claim 1 wherein said slip ring groove is generally V-shaped.

3. A slip ring assembly as recited in claim 1 wherein said brush is formed of a resilient material and said ball contact members are formed of a material having a low coefficient of friction which is different from the material forming said brush.

4. A slip ring assembly as recited in claim 3 wherein said slip ring is formed of twenty-four carat wrought gold and said ball contact members are formed of iridium.

5. A slip ring assembly as recited in claim 1 or 3 wherein said slip ring groove is deformed to the shape of said contact surfaces of said contacts by said predetermined loading by rotation of said slip with respect to said brush.

6. A slip ring assembly for conducting a plurality of electrical signals between two relatively rotating members comprising:

a plurality of individually insulated slip rings disposed on one of said rotating members, each of said slip rings having a groove with opposing walls extending about the outer perimeter thereof;

means for electrically insulating each slip ring from other slip rings;

a plurality of brushes disposed on the other of said rotating members, each of said brushes being associated with one of said slip rings and having a pair of opposed resilient arms arching about generally opposite sides of its associated slip ring groove;

a ball contact member mechanically fastened to and electrically connected with each arm of each brush and having a generally spherically shaped contact surface, said contact surface being seated in the groove of an associated slip ring to ride therein contacting opposite groove walls as said members rotate with respect to one another; and means for electrically insulating each brush from the other.

7. A slip ring assembly as recited in claim 6 wherein each of said brushes is floatingly mounted with respect to said other member to permit limited motion between said one and said other members without disturbing the seating of said contacts in their associated slip ring grooves.

8. A slip ring assembly as recited in claim 7 wherein limited motion is permitted between said one and said other members in both a radial and an axial direction.

9. A slip ring assembly as recited in claim 6 wherein each of said brushes is fixedly mounted with respect to said other member.

10. A slip ring assembly as recited in claim 7 or 9 wherein a first set of said brushes extends radially from said other member towards said one member in a first direction and a second set of said brushes extends radially from said other member towards said one member in another direction generally opposite of said one direction, brushes of said first set alternating with brushes of said second set along the axis of relative rotation.

11. A slip ring assembly as recited in claim 6 wherein each of said one member and said other member are molded.

12. A slip ring assembly as recited in claim 6 wherein each of said one member and said other member are formed of a plurality of radially extending laminations which are stacked together in an axial direction.

13. A slip ring assembly as recited in claim 1 wherein limited axial and radial motion is permitted between said brush and said slip ring without disturbing the seating of said two contacts in said slip ring groove.

14. A slip ring assembly comprising:

a generally cylindrical brush block having a centrally disposed, axially extending orifice;

a shaft disposed in said brush block orifice and being rotatable with respect to said brush block about the central axis of said brush block;

bearings disposed between said brush block and said shaft to permit relative rotation therebetween;

means for axially aligning said shaft with respect to said brush block;

a plurality of slip rings disposed about the outer circumference of said shaft, said slip rings being aligned axially adjacent one another along said shaft, each of said slip rings having a groove extending about the outer perimeter thereo;

means for electrically insulating each slip ring from the other;

a plurality of brushes disposed in said brush block, each of said brushes being associated with one of said slip rings and having a pair of opposed resilient arms arching about opposite sides of its associated slip ring groove;

a contact secured to each arm of each brush and being adapted to have a generally spherical contact surface thereof seat and ride in the groove of an associated slip rings, said shaft rotates with respect to said brush block;

means disposed on said brush block for insulating each brush from the other and for forming slots permitting limited axial and radial movement of said brushes with respect to said brush block in response to radial and axial movement of said shaft with respect to said brush block;

means associated with each brush for conducting a signal from a location external of said slip ring assembly to its associated brush; and means associated with each slip ring for conducting signals from its associated slip ring to a location external of said slip ring assembly.

* * * * *